(12) United States Patent
Saiz

(10) Patent No.: US 6,700,218 B2
(45) Date of Patent: Mar. 2, 2004

(54) WING ENERGY CATCHMENT DEVICE

(76) Inventor: Manuel Munoz Saiz, San Emilio 16, 1, 3, Madrid (ES), 20817

( * ) Notice: Subject to any disclaimer, the term of this patent is extended or adjusted under 35 U.S.C. 154(b) by 123 days.

(21) Appl. No.: 10/095,648

(22) Filed: Mar. 12, 2002

(65) Prior Publication Data

US 2003/0141720 A1 Jul. 31, 2003

(30) Foreign Application Priority Data

Jan. 25, 2002 (ES) .......................................... P200200165

(51) Int. Cl.$^7$ ................................................. F03D 9/00
(52) U.S. Cl. .............................. 290/55; 290/44; 415/3.1
(58) Field of Search ............................. 290/43, 44, 54, 290/55; 415/3.1, 4.4; 416/176, 8

(56) References Cited

U.S. PATENT DOCUMENTS

| | | | | | |
|---|---|---|---|---|---|
| 3,995,170 A | * | 11/1976 | Graybill | ....................... | 290/55 |
| 4,047,833 A | * | 9/1977 | Decker | ....................... | 415/4.4 |
| 4,346,305 A | * | 8/1982 | White | ....................... | 290/55 |
| 4,494,007 A | * | 1/1985 | Gaston | ....................... | 290/44 |
| 4,859,146 A | * | 8/1989 | Labrador | ....................... | 416/8 |
| 5,134,305 A | * | 7/1992 | Senehi | ....................... | 290/55 |
| 5,808,369 A | * | 9/1998 | Whelan | ....................... | 290/55 |
| 6,036,443 A | * | 3/2000 | Gorlov | ....................... | 416/176 |
| 6,537,018 B2 | * | 3/2003 | Streetman | ....................... | 415/3.1 |
| 2002/0187038 A1 | * | 12/2002 | Streetman | ....................... | 415/3.1 |

* cited by examiner

Primary Examiner—Nicholas Ponomarenko
(74) Attorney, Agent, or Firm—Robert M. Schwartz

(57) ABSTRACT

A wind energy catchment device comprising a central vertical shaft that rotates, the bottom end of which is secured by means of bearings to a rigid support fixed to the ground, the upper and lower part of the shaft have radial arms secured to it, evenly spaced one from the other, the outer ends of the upper arms are connected by cables or cords with its contiguous outer ends of the lower arms, between the upper and lower radial arms and the central shaft there are rectangular parallelepiped sails secured at their outer vertices. In all cases the furthest external vertical side of these sails or plates is secured and the sails or plates rotates from 90° to 180° with or around their shafts, cables or ropes that connect the ends of the arms, having both internal vertices loose, between the central shaft and two contiguous arms are arranged some parallel cords or mesh that support the sails or plates when they receive the air on the side of the mesh furthest from the wind.

10 Claims, 4 Drawing Sheets

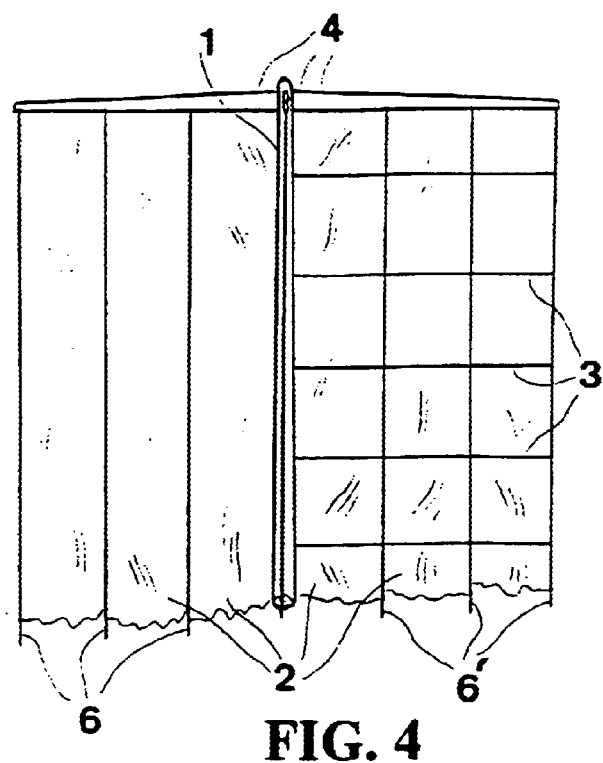
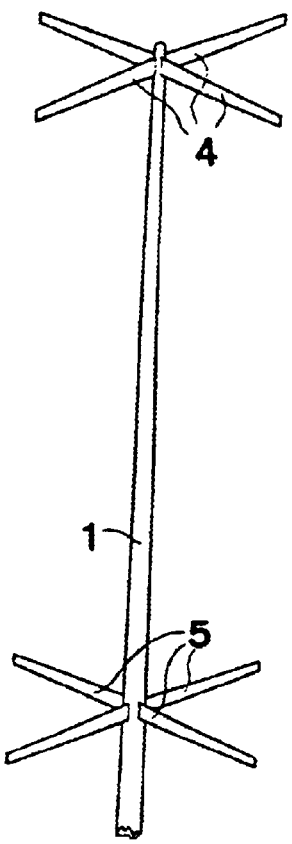
FIG. 4
FIG. 5
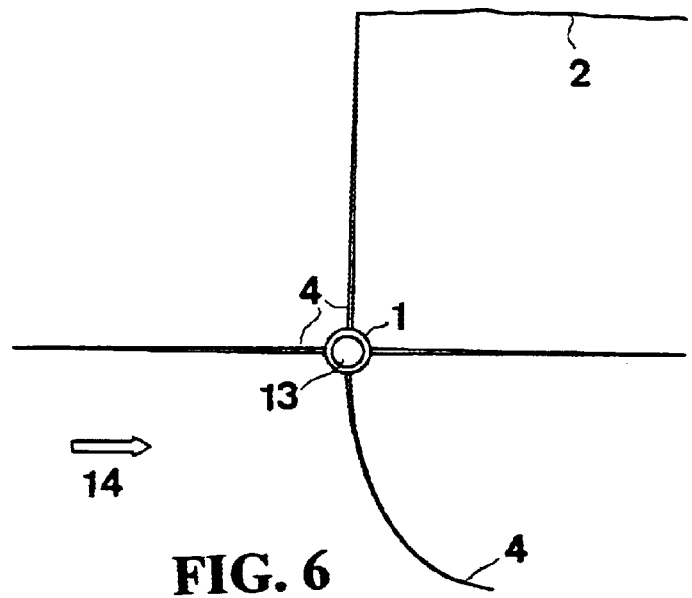
FIG. 6

WING ENERGY CATCHMENT DEVICE

CROSS REFERENCE TO RELATED APPLICATIONS

This patent claims the priority date of Spanish Patent P200200165 filed on Jan. 25, 2002. The basis for priority in this case is the Paris Convention for the Protection of Industrial Property (613 O.G. 23. 53 Stat 1748) The Spanish patent application was filed in the Official Patent and Trademark Office of Spain.

BACKGROUND OF THE INVENTION

1. Field of the Invention

This invention refers to a device for capturing wind energy using sails or plates, said devices principally generate electrical power and are of the large-scale type, using wind power in a centralized and commercial form.

2. State of the Prior Art

Current energy systems pollute if they use fossil fuels and are extremely radioactive if nuclear fuels are used. On the other hand, existing wind catchment systems require advanced technology, high costs, location on elevated sites and high winds to ensure thigh performance, and depend on wind conditions that are difficult to obtain. Such sites are not easily found. These facilities are difficult to control, complex, costly or impractical, and the energy proves more expensive than with conventional systems, while killing birds and generating a high environmental impact. They require systems for direction into the wind, and high technology.

DESCRIPTION OF THE INVENTION

The wind energy catchment device in the invention consists of a central vertical shaft that rotates, the bottom end of which is secured by means of bearings to a rigid support fixed to the ground, the upper and lower part of the shaft have radial arms secured to it, evenly spaced one from the other, the outer ends of the upper arms are connected by their shafts, cables or cords with its contiguous outer ends of the lower arms, between the upper and lower radial arms and the central shaft there are rectangular parallelepiped sails or plates secured at their outer vertices. In all cases the furthest external vertical side of these sails or plates is secured and the sails rotates from 90° to 180° with or around their shafts, cables or ropes that connect the ends of the arms, having both internal vertices loose. Between the shaft and two contiguous arms are arranged parallel cords or mesh that support the sails or plates when they receive the air on the side of the mesh furthest from the wind. Instead of cords or mesh the upper and lower side of the sails or plates can have a rod or bar that lean against the shaft or radial arms and produce the same effect.

The shaft can be hollow and rotates by means of bearings around a centre shaft fixed to the ground.

Between two radial arms can be used two or more sails or plates.

The device can adopt also a front view shape of a isosceles trapezoid and of a triangle, that is to say, with smaller or without its upper radial arms.

The sails or plates act like radial vanes or blades and can be reinforced with horizontal thin rods or strip which reduce their flapping or fluttering As a whole, the layout of the catchment device is such that the shaft is its axis of symmetry.

The sails or plates operate as valves, while the sails or plates of the-side receiving the air on the side of the mesh furthest from the wind create blockage and, therefor, maximum resistance, which is less on the opposite side, where the wind strikes the sails or plates on the side where the mesh is further ahead in relation to the wind.

During rotation, the wind catchment device is divided in relation to the incident wind into two halves: on one, the sails or plates offer maximum resistance, while this is minimal on the other half, thus causing and providing a high rotation torque, this is done cyclically on each sail or plate as it rotates.

The gust protection is performed using flexible radial arms formed by strips or bands narrowed lateral or horizontally and with their cross-section diminishing toward their outside end, it can used also linked radial arms with springs or strips on its link. In all cases when the wind speed increases the arms and in consequence the surface of the sails exposed to the wind are reduced.

One or two vertices can be secured by cords or cables of reduced cross-section, which will break under excessively strong winds or gusts.

The mechanical power obtain is directly use to elevate water in a well or it is transformed into alternate electrical power by means of an alternator or into electrical by means of a generator and into alternate current by means of an inverter.

Advantages. This catching device, provides a potent, cost-effective energy source independently of optimal wind conditions, it does not require optimal siting, nor does it have to be placed on very high ground. It does not require highly specialised personnel or techniques, whether constructed on a large or small scale. It is safe. It operates with winds from all directions. It is easy and cheap to repair, fit and dismantle. It is easily transported. It does not require a large structure. It can be made easily and economically. It self-protects against excessive wind. Economical power generators can be used. It captures a large amount of energy. It does not require a large part of the energy to run its own mechanisms. The sails or plates and their replacement is very cheap. It is generally installed on the ground. Per-KW cost is very low. High performance. The sails or plates are no noisy. Expensive steering mechanisms are not required. By using low-intensity winds, it has a longer annual period of use and allows for a larger number of usable zones. It is simpler and more economical. The generator and mechanisms are at the bottom. The complex steering system is not required. It can be used with winds from any direction. It does not kill birds or pollute. It does not produce vibrations.

BRIEF DESCRIPTION OF THE DRAWINGS

FIGS. 2, 6, 7 and 8 show top schematic views of different catchment devices.

FIG. 4 shows a front partial schematic view of a variant of the wind energy catchment device of the invention.

FIG. 5 shows a perspective schematic view of a variant of shaft and arms of the catchment device of the invention.

DETAILED DESCRIPTION OF THE INVENTION

Figure 1:
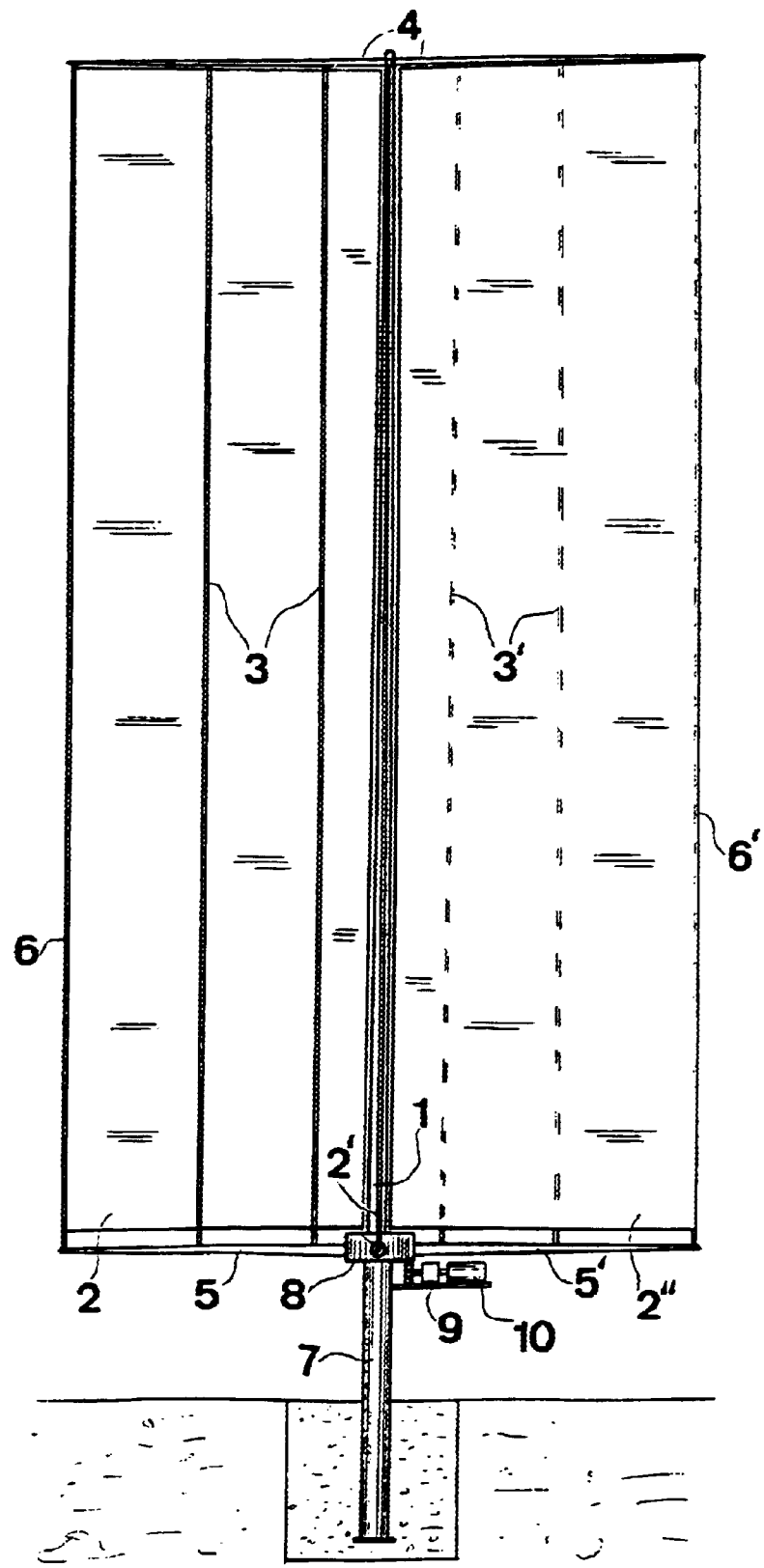
FIG. 1 shows a front schematic view of the wind energy catchment device of the invention.

FIG. 1 shows the rotating shaft (1), the sails or plates (2, 2', 2"); the cords or mesh (3 and 3'), the upper radial arms (4), the lower radial arms (5 and 5'), the cable or rotating shaft of the sails or plates (6 and 6') the rigid support (7) of the rotating central shaft, the gear and bearing assembly (8) the speed increaser (9) and the generator (10).

Figure 2:
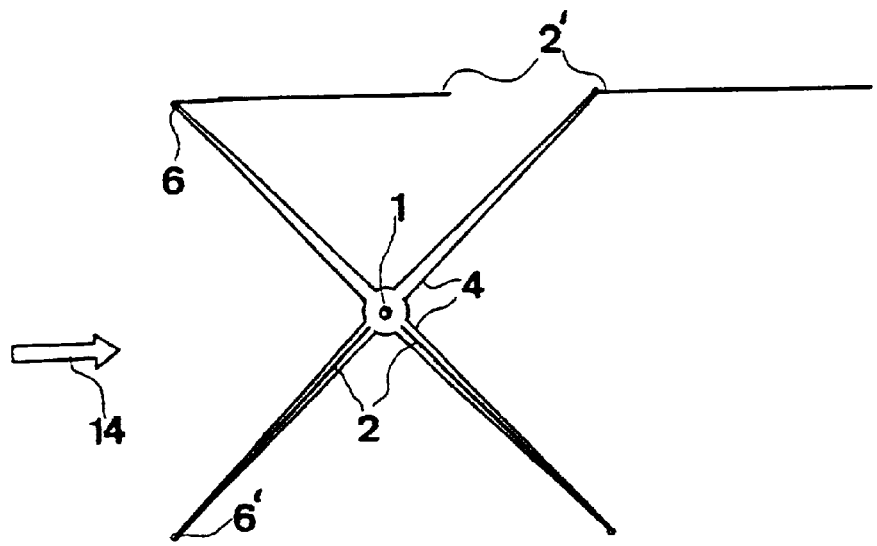

FIG. 2 shows the rotating shaft (1), the retracted sails or plates (2), the extended sails or plates (2') by the wind (14), the radial arms (4), the cables or rotating shafts of the sails or plates (6 and 6'). The sails or plates operate as valves, while the sails or plates of the side receiving the air on the side of the mesh furthest from the wind (2) create blockage and, therefor, maximum resistance, which is less on the opposite side, where the wind strikes the sails or plates on the side where the mesh is further ahead in relation to the wind (2').

Figure 3:
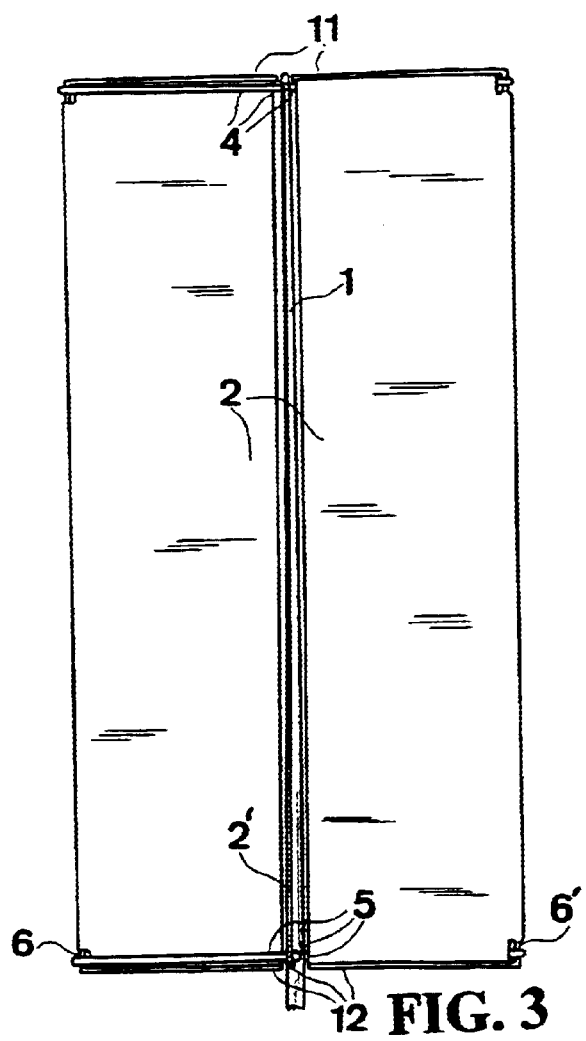
FIG. 3 shows a top schematic view of an energy catchment device variant.

FIG. 3 shows the rotating shaft (1), the sails or plates (2 and 2'), the upper radial arms (4), the lower radial arms (5), the cable or rotating shaft of the sails or plates (6 and 6'), the rods of the upper sides of the sails or plates (11) and the rods of the lower side of the sails or plates (12).

FIG. 4 shows the rotating shaft (1), the sails or plates (2), the cords or mesh (3), the flexible radial arms narrowed lateral or horizontally (4) and the cable or rotating shaft of the sails or plates (6 and 6').

FIG. 5 shows the rotating shaft (1), the upper radial arms (4) and the lower radial arms (5), all the flexible radial arms narrowed lateral or horizontally.

FIG. 6 shows the rotating shaft (1), the sail or plate extended (2), the flexible radial arms narrowed lateral or horizontally (4) and the arm (4') flexed or bent.

Figure 7:
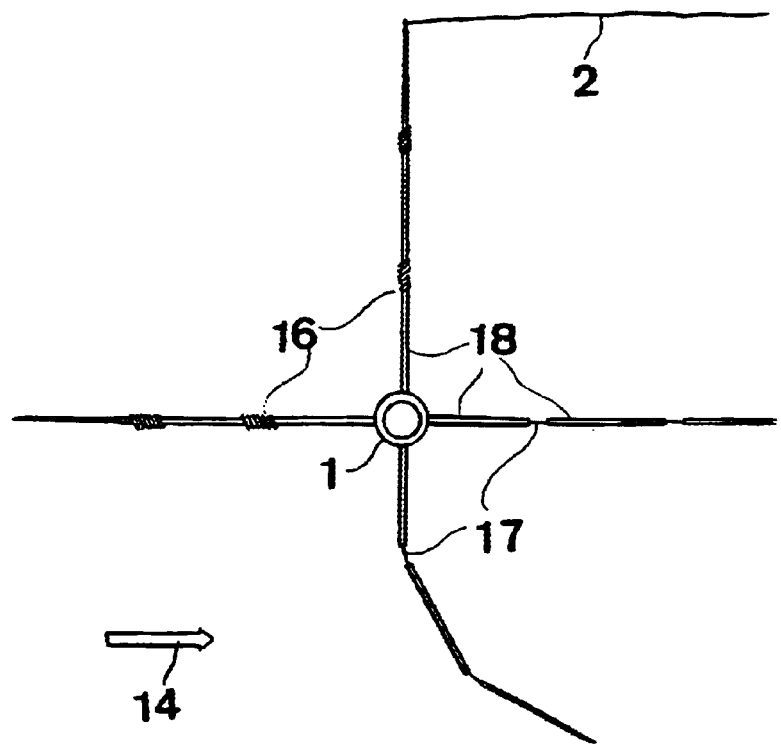

FIG. 7 shows the rotating shaft (1), the sail or plate extended (2), the upper radial arms formed by the pieces (18) joined by the springs (16) and strips or bands narrowed horizontally (17) and one of the arms flexed or bent by the wind action (14).

Figure 8:
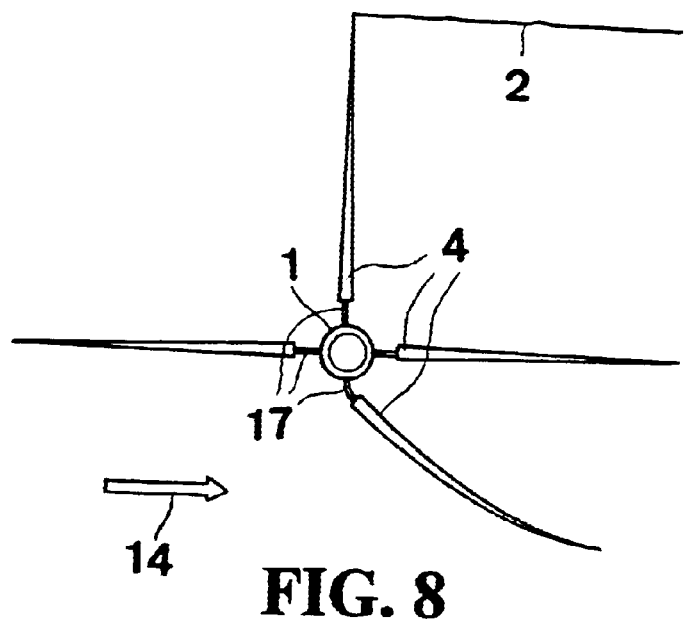

FIG. 8 shows the rotating shaft (1), the sail or plate extended (2), the strips or bands (17), the flexible upper radial arms (4) one flexed or bent by the wind action (14) all the arms and strips or bands narrowed horizontally.

What is claim is:

1. A wind energy catchment device comprising:
    a central vertical shaft that rotates, the bottom end of which is secured by means of bearings to a rigid support fixed to the ground,
    the upper and lower part of the shaft have radial arms secured to it, evenly spaced one from the other,
    the outer ends of the upper arms are connected by cables or cords with its contiguous outer ends of the lower arms and form outer vertical shafts,
    between the upper and lower radial arms and the central shaft there are rectangular perpendicular parallelepiped sails rotatably secured at their outer vertical shafts,
    wherein the furthest external vertical sides of these sails are able to rotate from 90° to 180° with or around their vertical shafts and between and around the central shaft and each of said sails receives the air on the side of the mesh when it is positioned to receive the wind pressure, and is floating in the wind direction on the opposite position to the one that receives pressure.

2. A wind energy catchment according to claim 1, wherein the upper and lower sides of the sails or plates have a rod or bar that lean against the shaft or radial arms.

3. A wind energy catchment according to claim 1, wherein are used two or more sails or plates between every two radial arms.

4. A wind energy catchment according to claim 1, wherein the device adopts a front view shape of a isosceles trapezoid the upper arms smaller.

5. A wind energy catchment according to claim 1, wherein the device adopts a front view of a triangle without its upper radial arms.

6. A wind energy catchment according to claim 1, wherein the sails are reinforced with horizontal thin rods or strips which reduce their flapping or fluttering.

7. A wind energy catchment according to claim 1, wherein the shaft is hollow and rotates by means of bearings around a centre shaft fixed to the ground.

8. A wind energy catchment according to claim 1, wherein are used flexible radial arms formed by strips or bands narrowed lateral or horizontally and with their cross-section diminishing toward their outer end.

9. A wind energy catchment according to claim 1, wherein are used linked radial arms with springs or strips on its link.

10. A wind energy catchment according to claim 1, wherein the lower vertices are secured by cords or cables of reduced cross-section, which will break under excessively strong winds or gusts.

* * * * *